(12) United States Patent
Johnson et al.

(10) Patent No.: US 8,090,768 B2
(45) Date of Patent: Jan. 3, 2012

(54) MEDIA CONTENT DEVICE AND SYSTEM

(76) Inventors: Sam Johnson, Suwanee, GA (US); Eric A. Toops, Dacula, GA (US); Fred Tanzella, Atlanta, GA (US)

( * ) Notice: Subject to any disclaimer, the term of this patent is extended or adjusted under 35 U.S.C. 154(b) by 0 days.

(21) Appl. No.: 12/244,990

(22) Filed: Oct. 3, 2008

(65) Prior Publication Data

US 2009/0030978 A1      Jan. 29, 2009

Related U.S. Application Data

(63) Continuation of application No. 09/547,710, filed on Apr. 11, 2000, now Pat. No. 7,451,177, which is a continuation-in-part of application No. 09/372,898, filed on Aug. 12, 1999, now abandoned, and a continuation-in-part of application No. 09/373,260, filed on Aug. 12, 1999, now abandoned.

(51) Int. Cl.
*F06F 15/16* (2006.01)

(52) U.S. Cl. ...... 709/203; 709/219; 715/719; 455/186.1

(58) Field of Classification Search .................. 709/220, 709/203, 219; 455/186.1; 715/719
See application file for complete search history.

(56) References Cited

U.S. PATENT DOCUMENTS

| | | | | |
|---|---|---|---|---|
| 5,732,216 A * | 3/1998 | Logan et al. | ... | 709/203 |
| 6,055,566 A * | 4/2000 | Kikinis | ... | 709/219 |
| 6,169,542 B1 * | 1/2001 | Hooks et al. | ... | 715/719 |
| 6,601,040 B1 * | 7/2003 | Kolls | ... | 705/14.23 |
| 2003/0040293 A1 * | 2/2003 | Fish et al. | ... | 455/186.1 |

* cited by examiner

*Primary Examiner* — Tammy Nguyen
(74) *Attorney, Agent, or Firm* — Smith Risley Tempel Santos LLC; Gregory Scott Smith

(57) ABSTRACT

A device for obtaining media content from a source and storing the media content for subsequent playback. A response mechanism enables a listener to generate response information associated with particular media content that is being rendered by the device. This response information can be delivered to a third party system for triggering the performance of specific actions related to the media content. A content system interfaces to the device and to the Internet. The content system obtains media content from one or more sources via the Internet and delivers the content to the device.

6 Claims, 10 Drawing Sheets

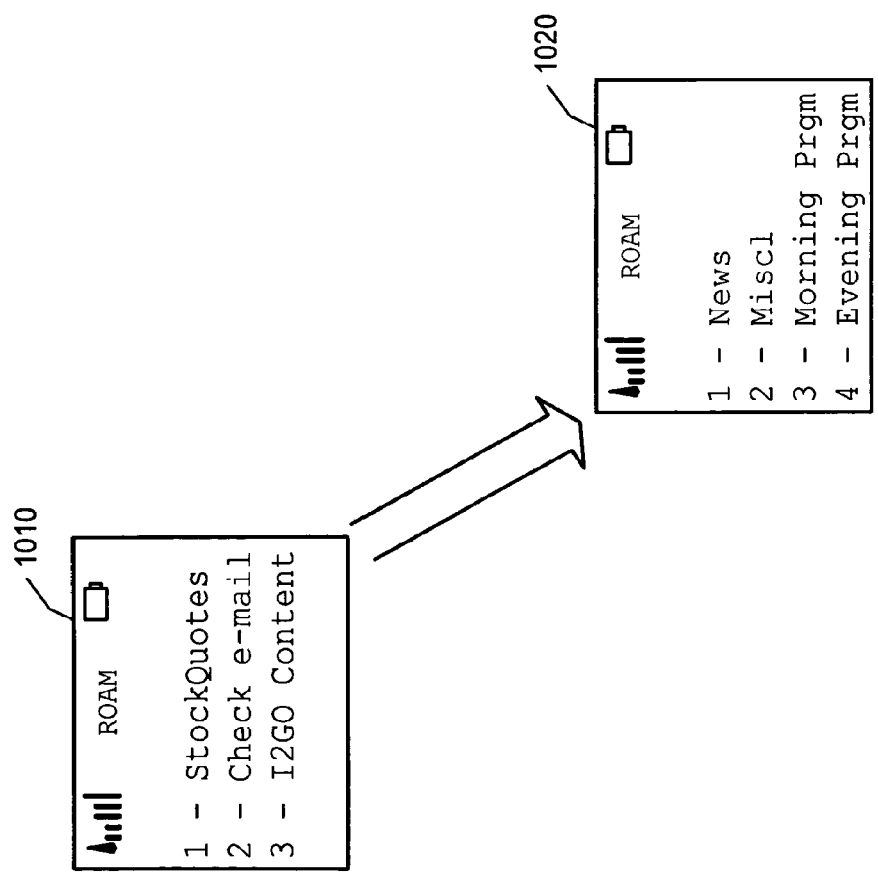

MEDIA CONTENT DEVICE AND SYSTEM

RELATED APPLICATIONS

This application is a continuation of U.S. patent application Ser. No. 09/547,710 filed on Apr. 11, 2000, now U.S. Pat. No. 7,451,177, which application is a continuation-in-part of U.S. patent application Ser. No. 09/372,898, entitled "A SYSTEM FOR AND METHOD OF IMPLEMENTING A CLOSED LOOP RESPONSE ARCHITECTURE FOR ELECTRONIC COMMERCE" and U.S. patent application Ser. No. 09/373,260, entitled an "INTERACTIVE AUDIO AND DATA PLAYER FOR DELIVERY OF SELECTED CONTENT AND INFORMATION TO A MOBILE USER AND OBTAINING A RESPONSE THEREFROM", both filed on filed on Aug. 12, 1999, both now abandoned.

TECHNICAL FIELD

The present invention relates to electronic commerce and, more particularly to a system, a method, and a device that enables the provision of feedback pertaining to received information and advertisements to initiate electronic commerce transactions and a playback device operable to receive a variety of content from various sources and playback the content at a later time.

BACKGROUND OF THE INVENTION

The Internet provides extensive and global access to information and opportunities for electronic commerce that did not exist just a few years ago. Until recently, access to the Internet was limited to those computers having access to a communication link, such as a telephone line, an ADSL connection, a cable modem or a T1 line. Thus, access to information through the Internet was restricted to locations that were in close proximity to such a communication link—typically the home or the office.

Recent advances in wireless technology expand the ability to access information over the Internet beyond the confines of the home or office. However, most of the present techniques employed to expand this access are inadequate or inefficient in the ability to deliver Internet based information. One technique of providing wireless access to the Internet is through use of cellular capable modems coupled to cellular telephones. However, wireless access to the Internet through the use of a cellular capable modem is slow, clumsy and unreliable. Another technique of providing wireless access to the Internet is through a wireless modem. However, the use of a wireless modem is inefficient due to the high expense associated with the hardware, and the fees levied by carriers, such as the monthly service charge and the fees assessed for downloading content. Furthermore, accessing the Internet using any of the aforementioned techniques ties up communications facilities and resources that may be required by a user for other purposes and is inconvenient, or even dangerous, for a user that is occupied with other tasks, such as driving an automobile, operating machinery, or working. Thus, there is a need in the art for a system and method for receiving information from the Internet that does not tie up communications facilities and is more convenient for a user.

One technique to address these needs in the art has been utilized in palmtop devices, such as the Apple Newton Messagepad 2000 and Palm III. These palmtop devices offer services whereby you can download Internet content from a web site, to a personal computer, and then to the palmtop device for later, off-line viewing. These palmtop devices only provide the simple one way exchange of data, from the web site to the user. The palmtop devices do not allow for any interaction with the web site and give no opportunity for feedback from the user to the web site. In addition, these devices provided information in a text only format. Thus a user that is driving in his or her car cannot safely read the text from the palmtop device. Thus, there is a need in the art for a system and method for downloading content from the Internet, delivering the content to the user, and allowing for responses to the content from the user to be returned to the content provider or the web site. There is also a need in the art for a system and method that will deliver audible Internet content to a user, as well as delivering textual content in a spoken manner, thus enabling a user to listen to the content of a web site and respond to that content.

From a commercial perspective, much benefit could be obtained through the delivery of audible advertisements to a user. For instance, a company that provides audible content to a user may be able to provide this service at no cost if businesses were allowed to interject advertisements into the audible content. Users of mobile web reading devices are an untapped market for goods and services. In addition, after delivering an advertisement to a user of a portable reading device, the ability to receive feedback from the user regarding the advertisement would be very beneficial. Presently in the art, there is no such system or method that allows a user to react upon hearing or reading an advertisement. The impulse buyer is lost to these potential e-commerce transactions. It is well known that directed advertising is more productive and cost efficient than blind advertising. It would therefore be beneficial for an advertiser to receive demographic information and feedback response information about an Internet user or audience and provide advertisements in accordance with this information.

Thus, there is a need in the art for a system and method that will allow advertisements to be inserted into downloaded web content for delivery to a user's playback device and will allow for responses to those advertisements to be returned back to the advertisers. There is also a need in the art for a system and method that will target the advertisements to particular users based on feedback information from a user and user demographic information that matches a demographic profile for an advertisement.

One technique to download a program of Internet information for user playback that does not require the use of communications facilities during playback, is to download the information at a time prior to the desired playback time. In this type of a system, as well as in other embodiments, it is desirable to allow a user to specify the particular content, categories of content, or the general nature of the content desired. In particular, it is desirable for the user to be able to compose a program either directly, or through entering profile information that can be examined and used to direct the composition of the program. In addition, for a program that has been composed based on the profile information (a "baseline program"), it is desirable to allow the user to alternate the baseline program, either partially or in its entirety. It is desirable for the ability to alternate the baseline program to include the ability to add, delete, or rearrange particular segments of the baseline program. Thus, there is a need in the art for a system and a method for providing web content programming that allows a user: to directly control the composition of the program; to guide the composition of a program by providing user profile information; and to alter the program by adding, deleting or rearranging the content of the program.

Therefore, it has been shown that there is a need in the art for a system and a method that constructs information content programming from the Internet and provides the delivery of programming in an audible form, that may include advertising information, and that can receive user feedback and demographic information to base the content of the programming and the advertisements.

SUMMARY

The above needs in the art are satisfied through one or more embodiments of the present invention. Generally described, the present invention provides for a system, a method, and a device that provide for the ability to receive information content from an information source and deliver the information content to a user or store the information content for later playback. One aspect of the present invention is to provide a closed loop system for delivering the information content obtained from an information content source to a playback device.

More specifically, one aspect of the closed loop system is the mobile-content server. The mobile-content server includes an information content source interface, a playback device interface, and a server application. The server application enables the mobile-content server to receive user information from a user. Based, at least in part, on the user information, the mobile-content server obtains content programming information via the information content source interface. The content programming information may take on a variety of forms. In one such form, the information content is in a raw form. In another form, the information content is in a series of content segments. The mobile-content server then delivers the content programming information to a playback device via the playback device interface. Finally, the mobile-content server receives response information from the playback device via the playback device interface.

Depending on the particular embodiments, the response information may take on a variety of forms. In one embodiment, the response information includes a time-stamp. The time-stamp allows the mobile-content server to identify the specific content pertaining to the response information. In another embodiment, the response information may identify a particular portion of the content programming information or any advertising content that may also be included.

Another aspect of the closed loop system is the playback device. The playback device includes a memory storage unit, an information content source interface, a mobile-content server interface; and a processing unit. In accordance with the content programming information received from the mobile-content server, the playback device is operative to receive information content from the information content source via the information content source interface and then store this information content into the memory storage unit or to provide the content to an audio output or source, such as a speaker. In one embodiment, the playback device receives content in a raw format. In this embodiment, the playback device converts the information content into one or more content segments in a format suitable for playback. Such formats include MP3 format or other digital compression formats. In other embodiments, the information content is received in a form suitable for storing without performing any conversion to the content.

The interface between the playback device and the mobile-content server can be accomplished using a variety of techniques and technologies including, but not limited to wireless interfaces such as cellular, paging, Bluetooth or the like, or any of a variety of wired interfaces. Likewise, the interface between the playback device and the information content source can be accomplished using a variety of techniques and technologies including, but not limited to, radio frequency transmissions, cellular, paging, Bluetooth or other wireless interfaces, as well as any of a variety of network interfaces including the Internet.

These and other aspects, features, and advantages of the present invention will be set forth in the description that follows and possible embodiments thereof, and by reference to the appended drawings and claims.

BRIEF DESCRIPTION OF THE DRAWINGS

FIG. 10 is a display diagram illustrating exemplary menu configurations for an exemplary embodiment of the present invention.

DETAILED DESCRIPTION OF EXEMPLARY EMBODIMENTS

Figure 1:
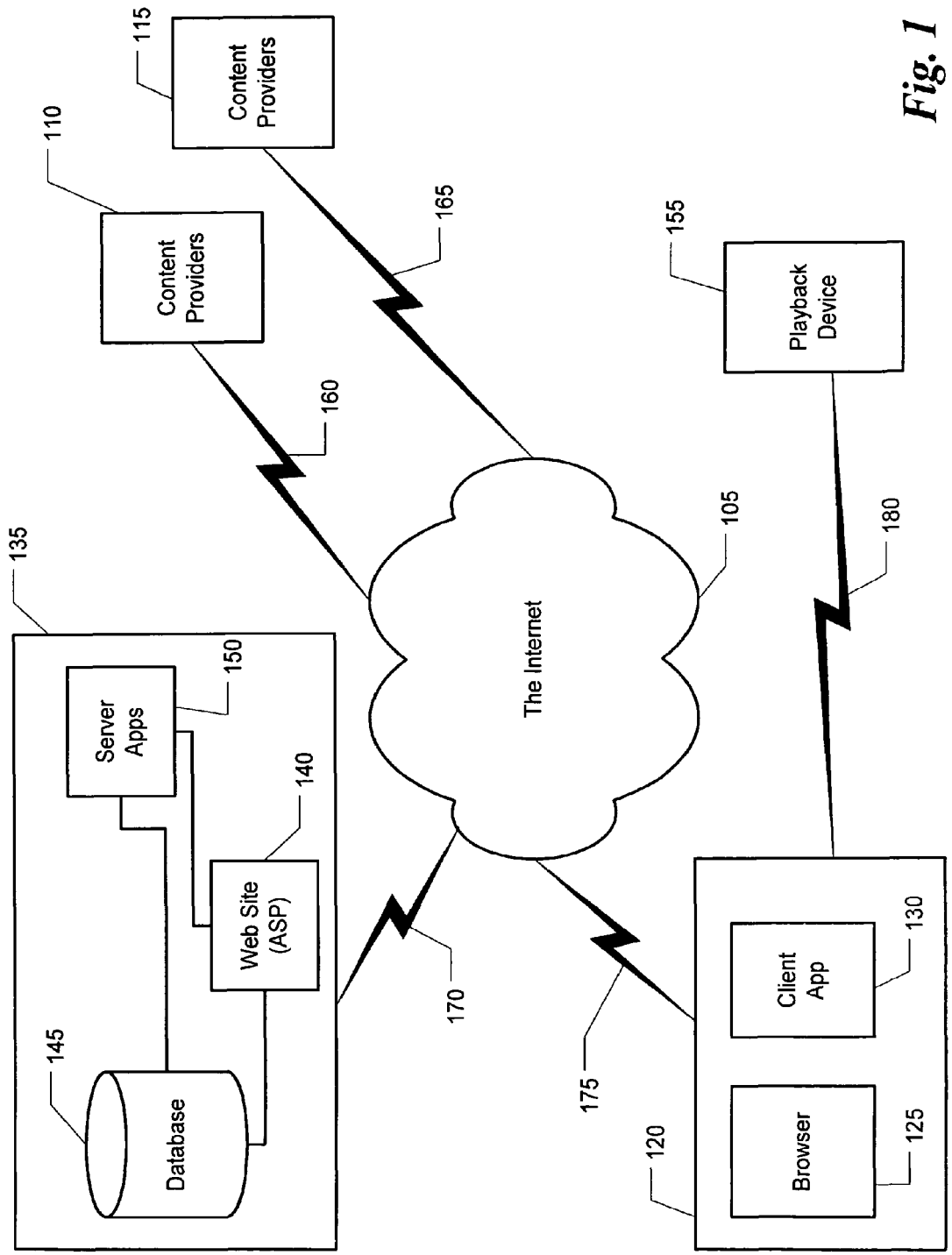
FIG. 1 illustrates the system architecture of an exemplary embodiment of the present invention.

The present invention provides a system and a method for implementing a closed loop response for facilitating electronic commerce transactions and for providing information to a mobile user. One configuration of the system includes a mobile-content server, a client platform, and a playback device. Another configuration of the system only includes a mobile-content server and playback device. In another configuration of the system, the functions of the mobile-content server and the client platform are combined into a single device that interfaces with a playback device. In yet another configuration of the system, only a playback device is required.

One aspect of the present invention is the composition of playback programs to be provided to the playback devices. A playback program is a composition of a variety of content including news, entertainment, advertising, and/or other forms of information. The playback programs can be downloaded to a playback device and then played back for a user. The content is included within a playback program in the form of content segments. Each content segment included in a playback program represents a segment of information, such as, a song, a news headline, a talk radio show, a broadcast sports event, stock performance or quote, sport score boards, or any of a variety of other types of information, or portions thereof, that can be delivered in electronic form. The present invention may generate the playback programs in: an autonomous manner; based on user profile information; based on live or recent input from a user; based on historical input from a user; and/or using other methods or techniques.

Another aspect of the present invention is to provide a variety of content segments that can be used by other devices to generate playback programs. In one embodiment of this aspect of the present invention, a playback list is used to construct a playback program from the variety of content segments. The playback list is a list of program information that a user desires to receive. Advantageously, this aspect of the present invention enables a playback device to generate and provide a variety of playback programs. In operation, a variety of content segments are downloaded to the playback device. At playback time, the user may compose a playback list to define which content segments will be played back and in what order they will be delivered.

Another aspect of the present invention is to include directed advertisement content within the playback programs. The advertisement content for a playback program may be selected in: an autonomous manner; based on user profile information; based on live or recent input from a user; based on historical input from a user; and/or based on other methods or techniques. In addition, advertising content may be selected under the control of or based on information provided by an advertiser. This aspect of the present invention is further advanced through the ability for a user to provide feedback information to the system. The ability to provide feedback information allows an advertiser or service provider to receive a user's response to an advertisement or any other type of information provided to the user. In various embodiments of the present invention, the feedback capability may be used to allow a user to request additional information, initiate a purchase, and/or request to be added to a postal mail or electronic mail list.

Advantageously, various embodiments of the present invention allow a user to receive information content in a variety of forms including textual, audible, broadcast, transmitted, and visual. In addition, a user is able to identify desired programming content, receive playback programs that include the desired programming content at a convenient time (i.e., while the user is asleep or preparing to go to work), and playback the programming content at the user's convenience, such as on the way to work, on the user's lunch break, sitting in the doctor's waiting room, or the like. Now turning to the figures in which like numbers refer to like elements and processes throughout the several views, various embodiments of the present invention are described in greater detail.

General System and Operation Description

FIG. 1 illustrates the system architecture of an exemplary embodiment of the present invention that includes a mobile-content server 135, a client platform 120, and a playback device 155 all interconnected through the Internet 105. As those skilled in the art will understand, the Internet 105 is an electronic communications network that connects computer networks and organizational computer facilities around the world. While an exemplary embodiment of this invention will be described with reference to the Internet as the underlying electronic communications network, any widespread communications network, such as the upcoming Internet II, satellite networks, cellular networks, pager networks, trunked radio networks, band communication systems, cable broadcast networks, and VHF/UHF television broadcast networks will facilitate this invention.

The Internet 105 also facilitates communication with a plurality of information sources or content providers 110 and 115 over communication links 160 and 165, respectively. The content providers 110 and 115 may include informational web sites, such as cnn.com, msnbc.com, or news.com, commercial product web sites, such as amazon.com or barnesandnoble.com, and/or private or proprietary web sites. The means of linking content providers 110 and 115 to the Internet are well known to those skilled in the art. It should also be understood that the content provider may take on many forms and is not to be limited to a web site that may be accessed through the Internet. For instance, a compact disc player, a tape player, or any other variety of recorder, or even live and/or broadcast information may be used as a source for raw or formatted content.

The client platform 120 interfaces with the Internet over a communications link 175. The client platform 120 includes a browser 125 and a client application 130. The browser 125 may be a standard Internet browser such as NETSCAPE Communicator or Microsoft Internet Explorer, or a proprietary browser. As is well known to those skilled in the Internet, a browser allows a user to retrieve web pages, files, or the like from various content providers 110 and 115. The web pages may be graphically displayed for the user, who may then point-and-click his way through the world wide web.

The mobile-content server 135 in a typical embodiment of the invention comprises a database 145, a web site 140 and server applications 150. The mobile-content server 135 interfaces to the Internet over a communications link 170. The database 145 is used to provide storage for program data, content segments, playback programs, user profiles, as well as other information. The server applications 150 include program modules necessary to perform various tasks, such as, generating content segments and playback programs, managing e-mail messages and user profiles, executing electronic commerce functions, initiating and controlling information downloads, and processing responses from the client platform 120 or the playback device 155. The web site 140 provides an interface for users, devices, service providers, and/or advertisers to enter user profile information, select options and configurations, and provide information and advertising content.

In general, the mobile-content server 135 operates to receive and/or extract web-based information, or any other information content, from various content providers 100 and 115, convert the information content into content segments, package the content segments into a playback program, and download the playback program to the client platform 120 and/or to the playback device 155. In one embodiment, the mobile-content server 135 receives raw information from the content providers 110 and 115 and generates content segments. The mobile-content server then generates playback programs that include one or more of the content segments and downloads the playback programs to the client platform 120 and/or the playback device 155. In this embodiment, the playback programs are played as is by the playback device 155. In another embodiment, rather than generating playback programs, the mobile-content server may download the content segments to the client platform 120 and/or the playback device 155. Playback programs can then be constructed by the client platform 120 or the playback device 155 through the use of a playback list, in real-time by a user, or by using other means. The use of a playback list is advantageous in that it allows various content segments to be selected and played for a particular playback program. The playback list can be provided from the mobile-content server 135, generated and provided from the client platform 120, or generated by the user using the client platform 120 or the playback device 155. Alternatively, multiple playback lists can be downloaded to the playback device 155 and selected and enabled upon command by the user. In yet another embodiment, the mobile-content server 135 may receive content segments, rather than raw data, directly from the content providers 110 and 115. In another embodiment, the mobile-content server 135 may receive a pre-composed playback program, including information content segments and advertising segments, directly from a content provider 110. In this embodiment of the present invention, the pre-composed playback program may also be directly downloaded to the playback device 155, bypassing the need for the mobile-content server 135 and the client platform 120. In addition, the playback device may utilize a playback list to identify desired information content and then directly access various content providers 110 and 115 to download the information content either in real-time, or prior to playback time. Thus, if the playback device 155 includes an embedded receiver, the playback device 155 can enable the receiver at a particular time and on a particular frequency identified in the playback list and then receive and record content independent from the mobile-content server 135 and the client platform 120. In this embodiment, the playback list takes the form of programming information.

The client platform 120 is typically located within the user's home or office but, in practice, it is location independent. In an exemplary embodiment, the client platform 120 serves as a manager for the playback device 155 and facilitates or coordinates the transfer of information between the mobile-content server 135 and the playback device 155. As previously described, the client platform 120 may include a web browser 125 and a client application 130. Using the client platform 120 web browser 125, a user accesses, via the Internet 105, the web site 140 hosted by the mobile-content server 135. Accessing the web site 140, among other things, allows the user to establish an account, update and configure the account, enter profile information, and enter preference information. The web site 140, interacts with the database server 145 to store certain information provided by the user. Profile information defines attributes of the user and includes, but is not limited to, the user's name, company, address, e-mail, credit card information, etc. Preference information defines the type of services and products that the user desires and includes, but is not limited to, the desired content that the user wants to receive, categories of content that the user wants to receive, and scheduling information for obtaining and downloading the information to the user.

The server application 150, residing within the mobile-content server 135, performs various operations, such as, generating content segments, generating playback programs, providing content and e-mail aggregation and packaging based on the stored user profiles and preferences, electronic commerce processing, initiating downloads in accordance with scheduling information, and processing responses from the client platform 120 or the playback device 155.

In operation of an exemplary embodiment, the client application 130, operating within the client platform 120, initiates scheduled and on-demand connections to the mobile-content server 135. Once a connection is established, the client application 130 initiates the download of content segments and/or content packages or playback programs from the mobile-content server 135 to client platform 120. In addition, the client application 130 may upload any responses, previously received from the playback device 155, to the mobile-content server 135. The server application 150, operating within the mobile-content server 135, may store these responses, and based on these responses, invoke appropriate actions. Appropriate actions may include, but are not limited to, contacting content providers 110 and 115 to obtain additional information to be provided to the user, initiating or completing the purchase of a product, adding a user to a postal or electronic mailing list, or the like.

The playback device 155 is a mobile computing platform that is capable of voice, audio, data, and/or video playback. The playback device may be a proprietary hardware platform or a commercially available platform such as a Windows CE or Palm OS device, or an EGO device available from the assignee of the present invention and more fully described in U.S. application Ser. No. 09/373,260 assigned to the assignee of this application and hereby incorporated by reference. The playback device 155 includes: a processor; memory for storing playback programs, user responses and other information; an input interface that may include one or more buttons or other input capabilities; and an output interface including a display, a speaker, and/or an output audio and/or video jack. In the alternate embodiment in which the playback device 155 receives and records content independently from the mobile-content server 135 and the client platform 120, the playback device 155 includes a tunable receiver and/or an audio/data input for receiving broadcast content. In one specific example, the playback device 155 includes an AM/FM receiver. As is described in more detail below, this embodiment of a playback device 155 can be programmed to record specific broadcast content. The EGO device includes a cargo area in which various add-ons can be incorporated into the playback device. These add-ons may include an AM/FM receiver, BlueTooth transceiver, cellular telephone transceiver, or the like.

The playback device 155 operates to play a playback program. In addition, during the playback of a playback program, or even prior to or subsequent to the playback of a playback program, the playback device 155 is capable of recording responses from a user and associating those responses with particular content segments of the playback program. In one embodiment of the present invention, the user responses are associated with a particular content segment of a playback program by identifying the currently active content segment (i.e., the content segment being listened to or viewed on the playback device 155) at the time that the user responds (i.e., actuates a push-button switch). In another embodiment, the user may perform certain functions to associate a response with a particular content segment. In another embodiment, time-stamps may be used to index user responses into the information content. In addition, some embodiments of the present invention may partition each content segment into multiple sub-segments. In the multiple sub-segment embodiment, user responses may be associated with the sub-segments of the content segments. As an example, an advertising segment may include three sub-segments. If a user actuates a response button during a first sub-segment, the user may be put on a mailing list for additional information. If the user actuates the button during a second sub-segment, an electronic commerce transaction for the purchase of a product may be initiated. If the user actuates the response button during the third sub-segment, the user may be requesting additional information regarding the advertised product or service to be sent to the playback device 155 at a later time. An electronic commerce business method use of the present invention also includes sample products. In an embodiment of the present invention, a content segment may include an excerpt or sample of a product followed by a trailer or preceded by a header. The product may include songs, audible books, programs, infomercials, or any of a variety of other products. If the user actuates a response mechanism during the playback of the sample, then upon receiving the response, the mobile-content server 135 may initiate a first process such as ordering a full copy of the product and including the product in a future playback program. If the user actuates a response mechanism during the playback of the trailer, the mobile-content sever 135 may initiate a second process such as ordering a hard copy of the product in the form of a CD, DVD, video cassette, audio cassette, or other format. In another embodiment of the present invention, the playback program may contain e-mail messages. During the playback of an e-mail message, the response options for the user may include responding to the e-mail, marking the e-mail as read, deleting the email, or if the e-mail message prompts the user for a response, accepting the response from the user. In addition, the email message can be forwarded or responded to, as well as allowing the user to originate additional email messages. In one embodiment, the playback device 155 includes a microphone. Using this configuration, a user may respond to an email message by dictating his or her response into the microphone. The playback device records the response and stores the response in internal memory. The response can then be forwarded to the intended recipient. The response may be forwarded as either an audio file, or a speech to text conversion can be performed on the audio file. In addition, this embodiment of the present invention may also be used in conjunction with scheduling programs. For instance, if the user receives a message indicating that a conference has been scheduled, the response options may include accepting, declining or rescheduling the conference. It will be appreciated that the various aspects of the present invention may be utilized in a variety of electronic commerce business methods.

Responses from the user may be input in various methods, depending on the particular embodiment, and may include a simple singular push button either in hardware or displayed by software on a screen; input by multiple input buttons where each button has a different meaning; verbal commands interpreted by a voice detection device; and/or other forms of input.

The playback programs, or the content segments, may be loaded into the playback device 155 in several methods. In one embodiment, the playback device 155 is in communication over the communications link 180 with the client platform 120. In this embodiment, the information is exchanged between the playback device 155 and the client platform 120. The communications link 180 between the playback device 155 and the client platform 120 may be established by a physical, wired connection, a radio frequency transmission, by infrared or optical transmission, or through defined standards such as IrDA, cellular, paging, or BlueTooth. While a communications link is established, the client application 130 uploads from the playback device 155 any responses that may be stored within the playback device 155. These responses may then be uploaded by the client application 130 to the server application 150 for appropriate action. In addition, the client application will determine if any new playback programs or content segments are available on the client platform 120, and, if so, download them to the playback device 155. If no new playback programs or content segments are available, the user of the client platform 120 may demand the client application 130 to request a playback program or content segment from the server application 150. As previously described, the server application 150 may then retrieve content segments from the content providers 110 and 115, or retrieve raw information from the content providers 110 and 115 and generate content segments therefrom, package the content segments into a playback program or a content package, and download the playback program to the client platform 120. The client platform 120, in response to receiving the playback program, will store the playback program for downloading to the playback device 155 at a later time. In another embodiment, the playback device 155 includes an interface to an input device, such as a Compact Flash II device, for receiving playback programs. In this embodiment, pre-packaged playback programs can be purchased or received on a Compact Flash II device and then played by the playback device. Alternatively, the playback device 155 may be directly connected to the Internet 105 through ADSL, DSL and/or USBP, a broadcast network, cellular network, or the like, to upload the identity of the playback device 155 to a web site or information source and then download playback programs or content segments to the playback device 155.

It should be understood that the functions and features described as embodied within the mobile-content server 135, the client platform 120 and/or the playback device 155 may be distributed, combined, and/or divided between the various system components, or other components in any manner. For instance, the playback device 155 could include all of the necessary components to connect to one or more content providers 110 and 115, download information content, convert the information content into content segments, generate a playback program and then play the playback program. The present invention is not limited to any particular configuration of the system components and the distribution of the various functions and, in fact the various aspects of the present invention are equally applicable to these various embodiments. The operation of the invention will be more fully understood with reference to the flowcharts and the discussion associated with FIGS. 3 through 10.

Exemplary Environment

Figure 2:
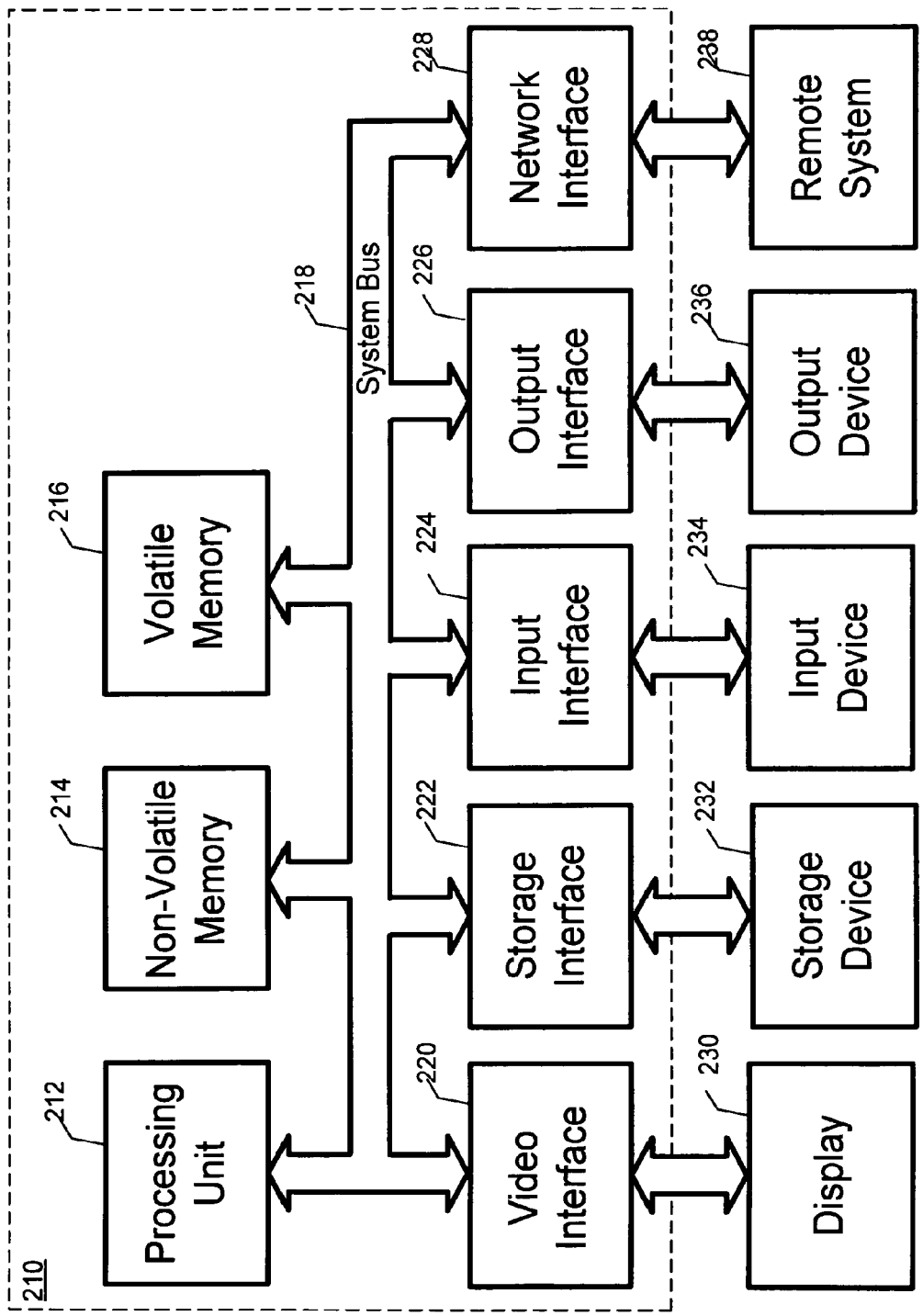
FIG. 2 is a system diagram that illustrates an exemplary environment suitable for implementing various embodiments of the present invention.

FIG. 2 is a system diagram that illustrates an exemplary environment suitable for implementing various embodiments of the present invention. FIG. 2 and the following discussion provide a general overview of a platform onto which the invention may be integrated or implemented. Although in the context of the exemplary environment the invention will be described as consisting of instructions within a software program being executed by a processing unit, those skilled in the art will understand that portions of the invention, or the entire invention itself, may also be implemented by using hardware components, state machines, or a combination of any of these techniques. In addition, a software program implementing an embodiment of the invention may run as a stand-alone program or as a software module, routine, or function call, operating in conjunction with an operating system, another program, system call, interrupt routine, library routine, or the like. The term program module will be used to refer to software programs, routines, functions, macros, data, data structures, or any set of machine readable instructions or object code, or software instructions that can be compiled into such, and executed by a processing unit.

Those skilled in the art will appreciate that the system illustrated in FIG. 2 may take on many forms and may be directed towards performing a variety of functions within a range of devices, any of which may serve as an exemplary environment for embodiments of the present invention.

The exemplary system illustrated in FIG. 2 includes a platform 210 that is made up of various components including, but not limited to, a processing unit 212, non-volatile memory 214, volatile memory 216, and a system bus 218 that couples the non-volatile memory 214 and volatile memory 216 to the processing unit 212. The non-volatile memory 214 may include a variety of memory types including, but not limited to, read only memory (ROM), electronically erasable read only memory (EEROM), electronically erasable and programmable read only memory (EEPROM), electronically programmable read only memory (EPROM), electronically alterable read only memory (EAROM), and battery backed random access memory (RAM). The non-volatile memory 214 provides storage for power on and reset routines (bootstrap routines) that are invoked upon applying power or resetting the platform 210. In some configurations the non-volatile memory 214 provides the basic input/output system (BIOS) routines that are utilized to perform the transfer of information between the various components of the platform 210.

The volatile memory 216 may include a variety of memory types and devices including, but not limited to, random access memory (RAM), dynamic random access memory (DRAM), FLASH memory, EEROM, bubble memory, registers, or the like. The volatile memory 216 provides temporary storage for program modules or data that are being or may be executed by, or are being accessed or modified by the processing unit 212. In general, the distinction between non-volatile memory 214 and volatile memory 216 is that when power is removed from the client platform 135, server platform 120 and playback device 155 210 and then reapplied, the contents of the non-volatile memory 214 is not lost, whereas the contents of the volatile memory 216 is lost, corrupted, or erased.

The platform 210 may access one or more internal or external display devices 230 such as a CRT monitor, LCD panel, LED panel, electro-luminescent panel, or other display device, for the purpose of providing information or computing results to a user. The processing unit 212 interfaces to each display device 230 through a video interface 220 coupled to the processing unit over system bus 218.

The platform 210 may have access to one or more external storage devices 232 such as a hard disk drive, a magnetic disk drive for the purpose of reading from or writing to a removable disk, and an optical disk drive for the purpose of reading a CD-ROM disk or to read from or write to other optical media, as well as devices for reading from and or writing to other media types including but not limited to, FLASH memory cards, Bernoulli drives, magnetic cassettes, magnetic tapes, or the like. The processing unit 212 interfaces to each storage device 232 through a storage interface 222 coupled to the processing unit 212 over system bus 218. The storage devices 232 provide non-volatile storage for platform 210.

The platform 210 may receive input or commands from one or more input devices 234 such as a keyboard, pointing device, mouse, modem, RF or infrared receiver, microphone, joystick, track ball, light pen, game pad, scanner, camera, or the like. The processing unit 212 interfaces to each input device 234 through an input interface 224 coupled to the processing unit 212 over system bus 218. The input interface may include one or more of a variety of interfaces, including but not limited to, an RS-232 serial port interface or other serial port interface, a parallel port interface, a universal serial bus (USB), an optical interface such as infrared or IrDA, an RF or wireless interface such as Bluetooth, a voice interface, or other interface.

The platform 210 may send output information, in addition to the display 230, to one or more output devices 236 such as a speaker, modem, printer, plotter, facsimile machine, RF or infrared transmitter, or any other of a variety of devices that can be controlled by platform 210. The processing unit 212 interfaces to each output device 236 through an output interface 226 coupled to the processing unit 212 over system bus 218. The output interface may include one or more of a variety of interfaces, including but not limited to, an RS-232 serial port interface or other serial port interface, a parallel port interface, a universal serial bus (USB), an optical interface such as infrared or IrDA, an RF or wireless interface such as Bluetooth, a voice interface, or other interface.

The platform 210 may operate in a networked environment using logical connections to one or more remote systems, such as a remote computer 238. The remote computer 238 may be a server, a router, a peer device or other common network node, and typically includes many or all of the components described relative to platform 210. When used in a networking environment, the platform 210 is connected to the remote system 238 over a network interface 228. The connection between the remote computer 238 and the network interface 228 depicted in FIG. 2 may include a local area network (LAN), a wide area network (WAN), a telephone connection, or the like. These types of networking environments are commonplace in offices, enterprise-wide computer networks, intranets and the Internet.

It will be appreciated that program modules implementing various embodiments of the present invention may be stored in the storage device 232, the non-volatile memory 214, the volatile memory 216, or in a networked environment, in a remote memory storage device of the remote system 238. The program modules may include an operating system, application programs, other program modules, and program data. The processing unit 212 may access various portions of the program modules in response to the various instructions contained therein, as well as under the direction of events occurring or being received over the input interface 224 and the network interface 228.

Operation of Various Embodiments of the Present Invention

Figure 3:
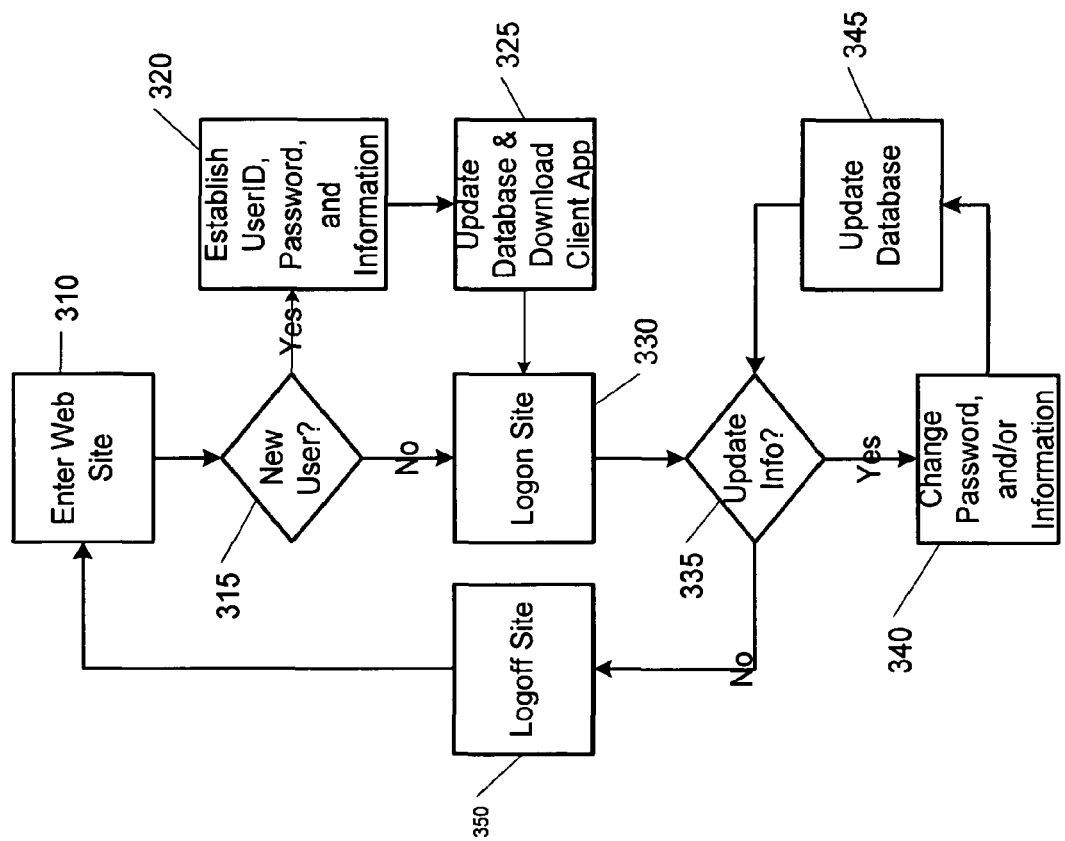
FIG. 3 is a flow diagram that illustrates the operation of an exemplary embodiment of the present invention when a user on a client platform using a browser contacts a web site on a mobile-content server.

FIG. 3 illustrates the operation of an exemplary embodiment of the present invention when a user on the client platform 120, using the browser 125, contacts the web site 140 on the mobile-content server 135. The steps illustrated in FIG. 3 describe the user access operations of a typical embodiment of the present invention. Those skilled in the art will understand that functions described in connection with FIG. 3 could be implemented in a variety of methods, with each method adding additional steps or eliminating other steps. Upon accessing the web site 140 of the mobile-content server 135 (step 310), the user is presented with the option of logging onto the web site or entering as a new user (step 315). In another embodiment of the present invention, each user may be assigned a unique identification number. Upon accessing the web site 140, the identification of the user is accessible to the web site 140, thus eliminating the requirement for the user to log into the web site 140.

Upon entering as a new user, the user is presented with a new user screen (step 320). At the new user screen, the user may be prompted to enter profile information and preference information. Profile information may include, but is not limited to, the user's name, company, email address, shipping address, credit card information, billing address or the like. Profile information may also include personal information, such as age, sex, occupation, income, hobbies, interests, and other demographic information. Those familiar with web sites will understand that additional profile information can easily be requested from users and collected.

The new user may also be prompted to enter preference information. The preference information, among other things, identifies the desired content that the user wishes to retrieve from the content providers, categories of content or information that the user wishes to receive, types and brands of merchandise that a user prefers, and scheduling information for obtaining and downloading the information. As previously mentioned, the desired content may be retrieved or received from the content providers 110 and 115 as raw web-based information and then converted into content segments, as content segments, or as encapsulated within a playback program. Regardless of the format received, the desired content is ultimately represented in the form of one or more content segments. The user can specify the desired content at various levels of detail. For instance, the desired content may be last nights baseball scores from espn.com, the front page of the last Sunday's edition of the New York Times from nytimes.com, or the first hour of the Neal Boortz talk radio show from boortz.com. When a user requests content at this level of detail, the user may enter the specific web address of the content provider 110 or the name of the content provider. When the mobile-content server 135 attempts to compose or aggregate a playback program, the server application 150 will access the specific web address or look up the name of the content provider in a database to find the appropriate address of the content provider 110. Alternatively, the user may request content by providing search information such as subjects, titles, events, names, locations, key words, or the like. The mobile-content server 135 may include a proprietary search engine or utilize one or more of a variety of available search engines to find and obtain web-based information or content segments related to the search information. The mobile-content server 135 may further filter this information based on the user's profile and/or preference information. The user may also request information of a more general nature. To provide this feature, categories of content are presented to the user to select as input for the user's preference information. In one embodiment, the categories represent collections of predefined content providers 110 and 115 fitting a particular characteristic. Examples of categories are business, sports, and music. A business category may include information from content providers such as the Wall Street Journal, nytimes.com, cnnfn.com, and thestreet.com.

Commonly, a user is reluctant to enter personal information into a web site for a variety of reasons, even if the web site is protected by password access. This reluctance may be due to a lack of trust in the privacy of the information or simply due to a lack of time. The present invention helps to alleviate this reluctance by giving users credits for personal information that they enter into the system. The credits may be awarded to the user in a variety of methods. One method is to assign a weighted value to each item of information that the user may enter and awarding credits based on this weighted value. Another method is to award credits based on the percentage of the total amount of information that the user provides. Thus, the more personal information that the user enters, the more credits the user will receive. The user will later be able to exchange these credits for free items, coupons, services or discounts from participating content providers, or the like. The credits may take the form of the Internet Flooz currency or other similar forms. In addition, the user profile information and preference information may be used to select various types of credits to award to the user. For instance, if the user profile and preference information indicates that the user is a golfer, the user may receive credits to be used at a sports shop or on an Internet based golf supply catalog. In addition, if the user preference information indicates that the user prefers Taylor Made™ brand golf equipment, the user may be awarded credits toward the purchase of Taylor Made™ sporting equipment.

The new user may also be prompted to enter scheduling information. The scheduling information details when the user would like the mobile-content server 135 to aggregate the content segments into a playback program and download to playback program to the client platform 120 and/or the playback device 155. In one embodiment of the present invention, high-speed Internet connections may be used by the mobile-content server 135 in accessing various content providers 110 and 115 to obtain web-based content or content segments, whereas slower speed connections may be used to download the playback programs to the client server 120 and/or the playback device 155. In this embodiment, because of the large amounts of data associated with audio and/or video files, the user will want to schedule aggregation and downloading of playback programs prior to the user's wanting the content packages in the user's playback device. For instance, a user scheduling may request a content package to be ready on his client platform at 7 a.m., so that the user can listen to the information on the way to work. In this case, aggregation, packaging and downloading of content may begin at 3 a.m. to be ready in time. In another embodiment, high-speed connections may be used to download the playback programs or content segments to the client server 120 and/or the playback device 155. In these embodiments, more flexibility is provided to the user regarding when the playback programs can be downloaded. In fact, in certain circumstances the playback programs may be generated and downloaded in real-time to the playback device 155.

The new user may also be prompted to select a user name and password combination. The user name and password combination should be unique to distinguish this user from all other users. Once the profile information, the user name and the password are established, the database 145 is updated with this information (step 325). In addition, in certain embodiments, the server application 150 may download the client application 130 onto the client platform 120. Alternatively, the client application can be distributed on a storage medium, such as a CD ROM, floppy disk, Compact Flash II, Compact Flash, or DVD, and installed on the client platform 120 by the user.

After updating the database 145, the user is returned to the web site 140 where the user may log onto the web site 140 or exit (step 330). Users that have previously accessed the system as a new user are also directed to this step. A user already in the database may log onto the web site 140 by entering his user name and password. Optionally, a cookie may have been placed on the client platform 120 that will identify the user to the web site 140, so that the user will only have to enter his password. A cookie is a small bit of information stored by a web site through the user's browser enabling web sites to recognize the user upon the user's return to the web site. Optionally, the user may store his user name and password within his client platform 120, so that information is automatically passed to the mobile-content server 135 to eliminate having to enter the user name and password. The mobile-content server 135 will verify the user name and password of the individual against those stored in the database 145 and allow the user access to his information if the user name and password are valid. An invalid user name and password will allow the user additional attempts to enter a valid user name and password.

A user also has the option of updating the user information. If the user chooses not to do anything, the user can log off the web site 140 (step 350) and return to the front page of the web site 140 (step 310). If the user elects to update his password, profile information, preference information, or schedule information, processing continues at step 340. Using a variety of techniques, the user can view the user's current information, enter new information, or modify existing information.

Upon completion, the modified information is stored into the database 145 (step 345) and processing returns to step 335.

Figure 4:
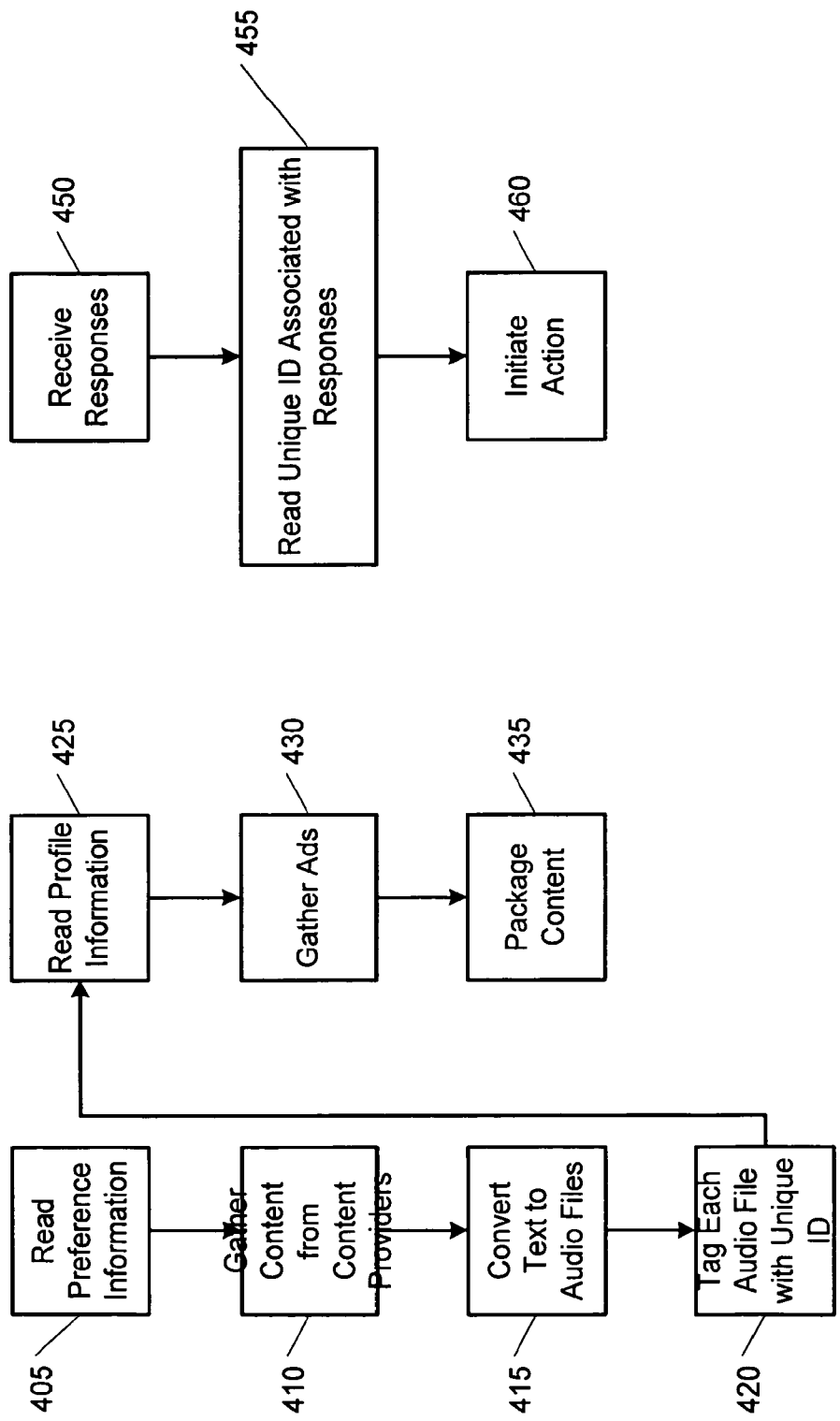
FIG. 4 is a flow diagram that illustrates two of the several processes running in the server applications of a mobile-content server in an exemplary embodiment of the present invention.

FIG. 4 illustrates two of the several processes running in the server applications 150 of the mobile-content server 135 in an exemplary embodiment of the present invention. The first process, illustrated in blocks 405 through 435, shows the process of creating a content package or playback program to be downloaded to the client server 120 and/or the playback device 155. Each user has a stored schedule indicating when the content segments should be aggregated, packaged into content packages and delivered to the client platform 120. The mobile-content server 135 keeps an index of all of the users and their schedules. When an update is triggered for a particular user at the mobile-content server 135, either due to a scheduled update or because the user requests an on demand update either directly or through the client platform 120, the server application 150 reads the preference and/or the profile information for that particular user (step 405). From the preference and/or profile information, the server application 150 generates a list of web sites.

At step 410, the mobile-content server 135 initiates the download of information from the web sites of various content providers 110 and 115 based on the list of web sites, and stores them as content segments. If the web sites are textual, all static graphic information is stripped, and the text files are stored. If the web site contains an audio or video file, these files are stored in the mobile-content server 135.

At step 415, all text files that have been downloaded may be converted to audio files depending upon the format required for the playback device 155. The audio files are stored in a standard audio format such as mp3. While this invention will make reference to mp3 files as an exemplary embodiment, those skilled in the art will realize that the particular format is unimportant. Any video files remain in their video format. In the exemplary embodiment, the video format is mpeg although any format may be used.

At step 420, the mobile-content server 135 generates and tags each audio and video file, or each content segment, with a unique identifier. The mobile-content server 135 maintains a database of the unique identifiers, the content segments, and the associated web sites. In one embodiment, the unique identifier is appended to the front of each audio or video file. Alternatively, an ordered list of unique identifiers may be associated with a content package or playback program. Other embodiments may use differing techniques to associate the unique identifiers with the content segments or sub-segments within a playback program and the present invention anticipates such techniques and is not dependent upon any particular technique.

At step 425, the user profile information for the particular user is read from the database. At step 430, the user profile information is used to select advertisement segments to be included in the playback program. The selection and integration of the advertisement segments into the playback program is an important aspect of the present invention. In an exemplary embodiment of the present invention, advertisers may provide advertisement segments along with target profile information. The target profile information may include multiple fields that are used to identify the type of person that the advertisement should be directed towards. In selecting advertisements, the user profile information is compared with the target profile information. Advertisements are selected and aggregated for a user based on matches and correlation between the user profile information and the target profile information. Thus, using this aspect of the present invention, the advertisements may be tailored specifically to a particular user. Advantageously, this unique profile matching aspect of the present invention enables advertisers to more effectively reach their audience. In addition to profile advertisements described above, universal advertisements intended to go to any or all users may be aggregated. In an exemplary embodiment of the present invention, each advertisement segment also has an associated unique identifier stored in the database 145 and appended to the front of the advertisement file or associated with the advertisement segment in some other manner.

At step 435, the audio segments, video segments, and advertisement segments, collectively termed content segments, are aggregated into a content package or playback program. In an exemplary embodiment of the present invention, a playlist is generated along with all of the associated content segments and deemed to collectively form the content package. This playlist contains a serial list of all of the content segments and their associated unique identifiers or can be used to index the content segments. Alternatively, a single file may be generated to form a content package or playback program comprising the content segments. In an exemplary embodiment, one or more advertisements are placed between each of the non-advertisement content segments. It should be understood that the length of the content segments, the number of advertisements segments between non-advertisement segments, and the number of non-advertisement segments between advertisement segments is not critical to the present invention, and in fact, the present invention anticipates any particular configuration.

After a playback program is generated, it may be downloaded to the client platform 120 upon command from the client application 130 or, in other embodiments, directly to the playback device 155. The creation of a content package will be more fully understood with reference to FIG. 5.

Blocks 450 through 460 illustrate a second process running in the mobile-content server 135. This second process is the closed-loop response or feedback aspect of the present invention. As previously described above, the playback device 155 may receive the playback programs, as well as provide response information. Upon the playback device 155 linking to the client platform 120 over communications channel 180, response data may be uploaded to the client platform 120. In turn, the client platform 120 may then upload the response information to the mobile-content server 135. The response information that is ultimately provided to the mobile-content server 135 contains a list of responses from the user and the content segment, or sub-segment associated with the response. In operation, as the user listens and/or views the playback program on the playback device, the user can respond to any particular content segment by activating a response generator. In an exemplary embodiment, the response generator may be a button, a voice command, or any other means. In response to actuating the response generator, the playback device records the unique identifier of the currently active content segment in a response file in the playback device 155. This response file comprises the response information to be uploaded to the mobile-content server 135. On a multi-button playback device or a device equipped with voice detection, the response file also associates a response type with the unique identifiers.

At step 450, the mobile-content server 135 receives the response file from the playback device 155. At step 455, the server application 150 reads the listing of unique identifiers and, if applicable, the response type. The server application 150 will look up the unique identifier in the database to identify the web site offering, or advertisement, that is associated with the response and unique identifier. At step 460, the server application 150 initiates an appropriate action based on the response. The action depends on a predefined instruction for a particular web site or a default action. The server application may send a response message, by means of email, EDI, or any other known method, to the content provider 110 or advertiser notifying them that a particular user has responded to a particular segment or sub-segment. In the response message, the server application 150 may include particular pieces of profile information to assist the content provider in satisfying the response. In addition, future advertisements may be directed at the user based on his responses to previous content and advertisements. The default action may include sending an electronic mail message notifying the web site of a response and a set of default information. In one embodiment, the default information may include the name and electronic mail address of the responding user. It should be appreciated that the default information may vary between embodiments of the present invention.

In a multi-button system, each response may cause a particular action to be taken by the server application. A first button, an information or "i" button, may merely cause an electronic mail request to be sent to the content provider or advertiser indicating that further information should be sent to the user. A second button, a purchase or "$" button, may cause the product being described to be purchased for the user in an e-commerce transaction. For instance, the user may press the "$" button during an advertisement for a particular book by amazon.com. In response to receiving notice of this action, the mobile-content server 135 can transfer the name, credit card, billing, and shipping information for that particular user to amazon.com from the mobile-content server 135. Ultimately, the book is purchased and shipped to the user. The closed loop response feature of the invention, in this case, triggers a very simple e-commerce transaction for the user.

Similarly, in a voice activated system, each response may cause a particular action to be taken by the server application 150. A first response, requesting further information, may merely cause an electronic mail request to be sent to the content provider or advertiser for further information to be sent to the user. A second response, requesting purchase, may cause the product being described to be purchased for the user in an e-commerce transaction. For instance, the user may recite the word "purchase" during an advertisement for a particular book by amazon.com. In response to receiving notice of this action, the mobile-content server 135 may transfer the name, credit card, billing, and shipping information to amazon.com. Ultimately the book is purchased and shipped to the user. Once again, the closed loop response feature of the invention, in this case, triggers a very simple e-commerce transaction for the user.

In another embodiment, each particular content segment, advertising or non-advertising, may have an associated action. For instance, a content segment may be associated with such actions as: provide further information; perform purchase; provide related information; or the like. In this embodiment, a single button playback device may invoke various responses based on the action associated with the content segment. In a typical application of the present invention, advertisers may be charged at different rates based on the actions associated with or invoked for their advertisements. For instance, if a user initiates the purchase of a product, the advertiser may be charged more than if the user simply wants to receive additional information regarding a product.

In another embodiment of the present invention, each particular content segment, advertising or non-advertising, may be broken into sub-segments with each sub-segment having an associated header with a unique identifier. For instance, an advertising segment may have three sub-segments where actions in the first sub-segment are associated with the action of providing further information, the second sub-segment is associated with the action of purchasing, and the third sub-segment is associated with the action of providing information on related products. In this embodiment, the response to sub-segment association can be based on time (i.e., the first 60 seconds of a segment will be associated with a first response, the middle 10 minutes of a segment will be associated with a second response, and the last 60 seconds of a segment will be associated with a third response).

In another embodiment of the present invention, a response by the user in the mobile player will not only record the unique identifier of the segment currently being played, but will also record the segment time when the response occurred. For instance, if one minute into an advertising segment a response is received from the user, the response file will include the unique identifier of the response and the data "1:00" to denote that the response was received one minute into the segment. When the mobile-content server 135 receives this response file, the mobile-content server can initiate action based, at least in part, on the segment time.

Another aspect of the present invention is the ability for advertisers and content providers 110 and 115 to download information to the mobile-content server 135. In a process not illustrated, the server application 150 interacts with the web site 140. If an advertiser on the mobile-content server's 135 web site 140 is browsing the web site, the advertiser may drag an audio/video file including one or more content segments to a certain location on the web site's page (i.e., over the advertisers advertisement). This operation will result in loading the audio advertisement into the advertisement database for later use in aggregating and packaging the content packages for users of the system. This aspect of the present invention also provides an interface for the advertisers or content providers to enter target profile information. In another embodiment, a the mobile-content server 135 may provide a graphical display of a playback program to a service provider or advertiser. The service provider or advertiser can drag and drop various content segments into positions within the graphically displayed playback program.

Figure 5:
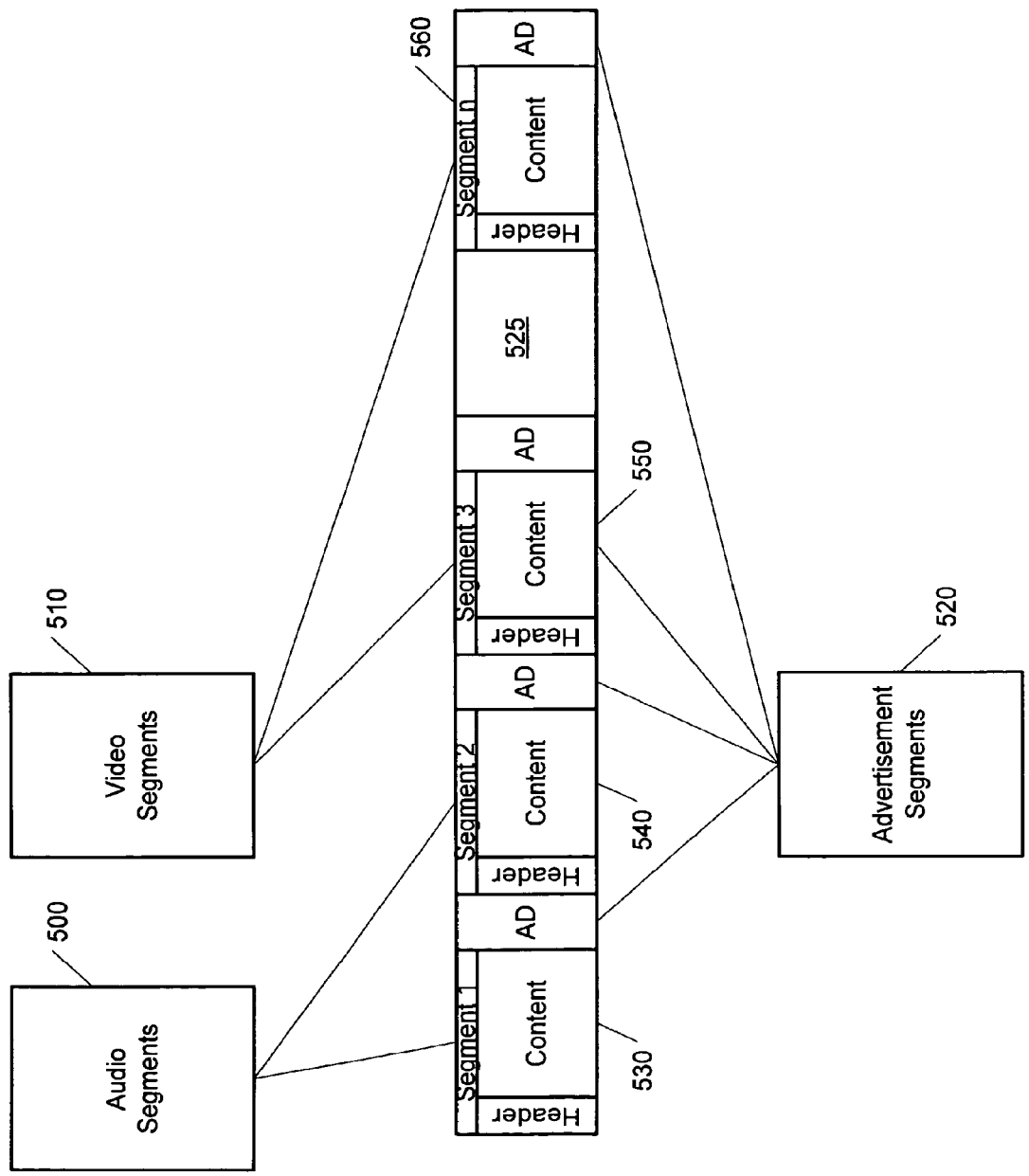
FIG. 5 is a data diagram illustrating the creation of a content package from content segments in an exemplary embodiment of the present invention.

FIG. 5 is a data diagram illustrating the creation of a content package from content segments in an exemplary embodiment of the present invention. As described previously, the mobile-content server 135 downloads the audio segments 500 and the video segments 510 from content providers 110 and 115. Alternatively, the mobile-content server 135 may generate the content segments internally from the raw web-based information. In addition, advertisement segments 520 are maintained in mobile-content server 135. The audio segments 500, video segments 510, and advertisement segments 520 are collectively known as content segments. The audio segments 500 and video segments 510 are collectively known as information content segments. Having been aggregated based on a user's profile, these content segments are strung together in playback program or content package 525 which has a total of n segments. Between each audio or video segment within the content package 525 advertisement segments may be placed. In the example of FIG. 5, segment 1 (530) contains an audio segment; segment 2 (540) contains an audio segment; segment 3 (550) contains a video segment; and segment n (560) contains a video segment. In an exemplary embodiment, each content segment begins with the unique identifier of the content segment placed therein. However, it will be appreciated that the present invention does not require any specific format for the content package or playback program 525, and in fact, many varied formats will also work with various embodiments of the present invention. Each advertisement also has a header (not shown) with a unique identifier placed therein. Segment 1 (530) through Segment n comprise package content 525.

Figure 6:
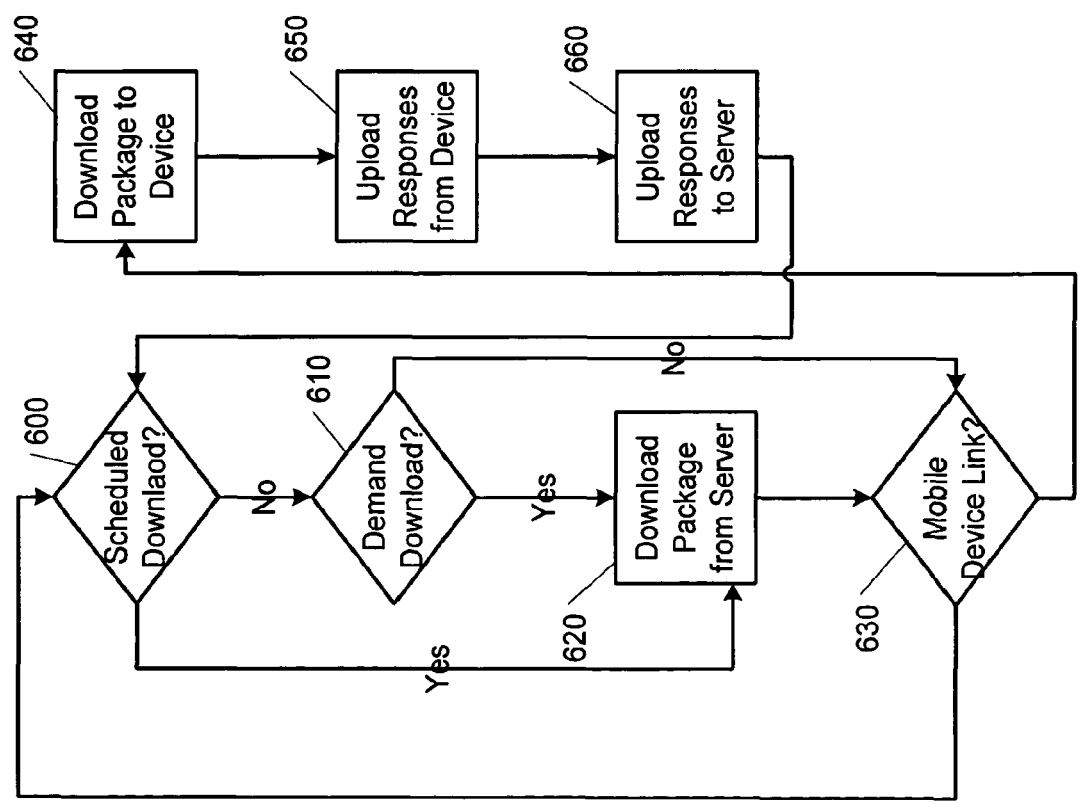
FIG. 6 is a flow diagram that illustrates the operation of the client application within the client platform 120 of an exemplary embodiment of the present invention.

FIG. 6 illustrates the operation of client application 130 within client platform 120 of an exemplary embodiment of the present invention. The aspect of the invention illustrated in FIG. 6 pertains to downloading information to and uploading information from the playback device 155. At step 600, the client application 130 checks to see if it is time to receive a scheduled download, and if so, control proceeds to step 620. If not, at step 610, the client application 130 checks to see if the user has requested a demand download. If not, control proceeds to step 630. At step 620, the client application 130 connects to the server application 150 and passes on the user's name. The server application 150 downloads the playback program or content package to the client application 130. If a content package is not prepared at the mobile-content server 135, e.g. the user has initiated a demand download, the mobile-content server 135 will prepare the content package and then download it to the client application 130. After a content package has been downloaded, at step 630, the client application 130 monitors to see if the playback device 155 is linked to the client platform 120. If not, control returns to step 600.

If a playback device 155 is linked to the client platform 120, control proceeds to step 640 where the content package is downloaded to the playback device. After completing the download, at step 650, the client application 130 receives or initiates the upload of any response files that are present within the playback device 155. The client application 130 then uploads the response information to the server application 150 at step 660.

Those skilled in the art will also appreciate that current and ongoing developments in cellular and wireless communications technology enable various embodiments of the playback device 155 to be in virtually constant communication with the client platform 120 or the mobile-content server 135 (depending on the embodiment). Thus, utilizing wireless communications technology, the playback device 155 can receive additional downloads or provide the uploads of response files either while the playback device is in use or idle. Thus, the present invention may be used within a system for providing real-time playback and responses.

The playback device 155 includes functionality to control the storage of the playback program, playback of the playback program, and store the responses. In an exemplary embodiment of the present invention this functionality of the playback device includes features that allow the playback program to be played, stopped, rewound, or fast forwarded. In addition, the software within the playback device 155 may allow for a next content segment and previous content segment feature so that users may easily move from content segment to content segment within the content package. In the preferred embodiment of the invention, the playback device 155 features a single response button for ease of use. When the response button is pushed, the unique identifier of the currently active content segment is recorded in a response file within the playback device 155 that will later be uploaded to the mobile-content server 135 either directly from the playback device 155 or via the client platform 120. Alternative embodiments of the present invention may include multiple buttons, voice detection, and any other means of detecting a response from the user, so that content providers may offer multiple responses for a given piece of content.

As previously described, the playback device 155 may include the capability of composing the playback program. An exemplary playback device 155 providing this capability may include the ability to receive and store content segments and then allow a user to listen to portions of the content segments and select or reject the content segments for the playback program.

Figure 7:
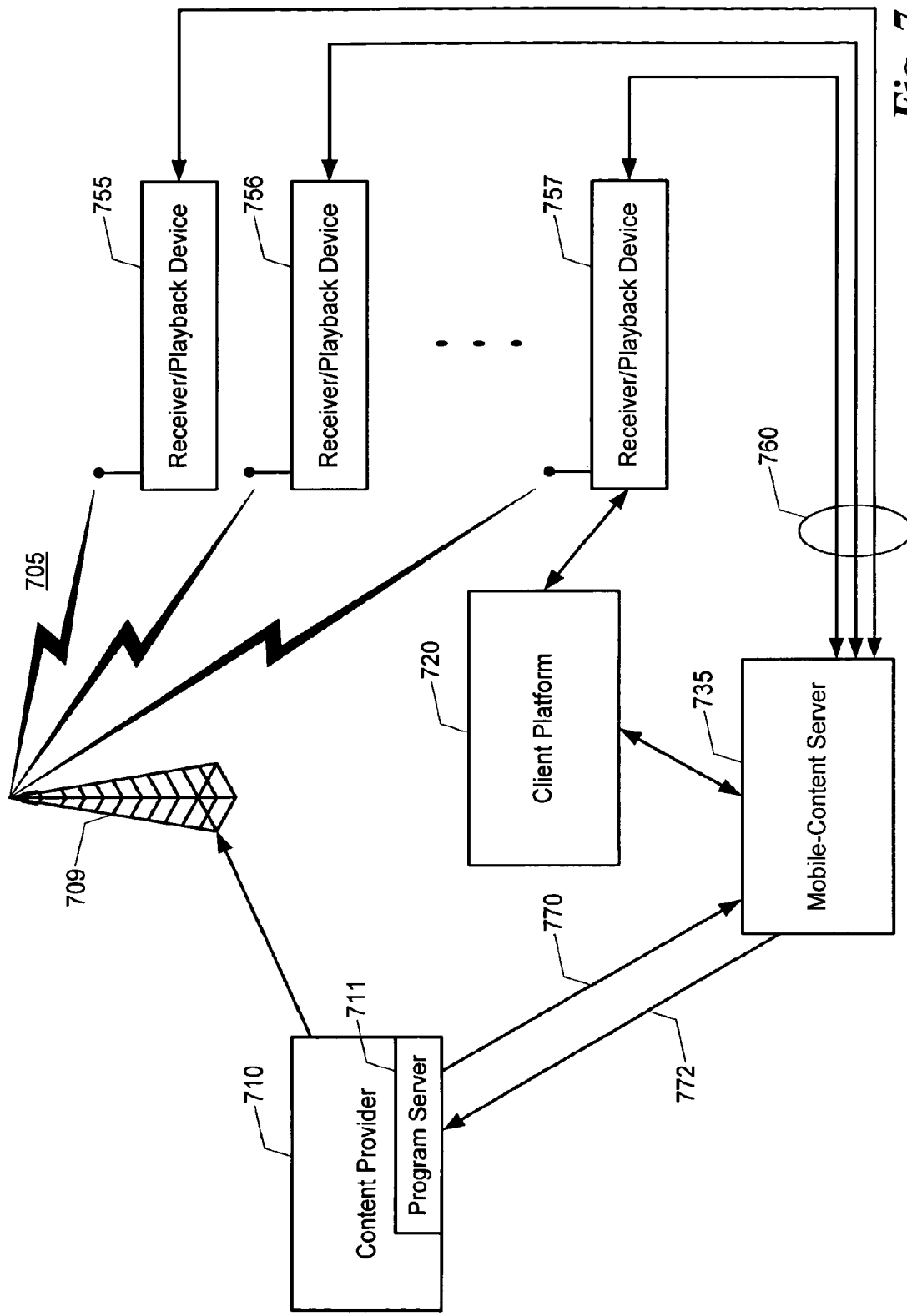
FIG. 7 illustrates the system architecture of another exemplary embodiment of the present invention.

FIG. 7 illustrates the system architecture of another exemplary embodiment of the present invention. In this embodiment, a content provider 710 interfaces with a mobile-content server 735 over a content provider to mobile-content server communication path 770. As previously described, this interface may be implemented through the use of the Internet, or through other means. The content provider 710 provides information content to various devices through a widespread communications network 705 including a transmission source 709 that broadcast signals to one or more receiver/playback devices 755, 756, . . . 757. In an exemplary embodiment, the information content source 710 may include an AM or FM radio station and the widespread communications network includes the transmission footprint of the radio station. As is known to those skilled in the art, broadcast companies broadcast content in accordance with a programming schedule that includes detailed specifications for the broadcast of entertainment, news, advertisements, or the like. This information may be compiled at the content provider 710 and delivered to the mobile-content server 735 over the content provider to mobile-content server interface 770 using multiple techniques. In one technique, a program server 711 is included and co-located with the content provider 710. The programming information is loaded into the program server 711 and is available for downloading to the mobile-content server 735. Alternatively, the programming information may be created at the mobile-content server 735. Other techniques may also be employed; however, the final outcome of any such technique should result in a detailed programming schedule identifying, at a minimum, the category of the information content and the time that it is to be delivered via the widespread communications network 705.

A user may then access the mobile-content server 735 to identify programming information for the playback device. The programming information identifies the information content sources from which to obtain the information content. The programming information may then be downloaded to the playback device. In an alternate embodiment, the playback device can be directly programmed by a user with the programming information.

A playback device 755, 756, . . . 757, equipped with the appropriate interface to receive the information content over the widespread communications network 705, receives the information content and either instantaneously plays the information content to a user or stores the information content into internal memory for later playback. The playback device 755, 756, . . . 757 in this embodiment of the invention may include a real-time clock and a response generator. The playback device 755, 756, . . . 757 interfaces to the mobile-content server 735 over a mobile-content server/playback device interface 760. During the playback of the information content, a user may actuate the response generator of the playback device 755, 756, . . . 757. In response to the response generator being actuated, the playback device will store a time-stamped response into the response file for downloading to the mobile-content server 735 at a later time. Alternatively, the mobile-content server/playback device interface 760 of the playback device 755, 756, . . . 757 may be a wireless interface to the mobile-content server 735. In this embodiment, the time-stamped response can be immediately provided to the mobile-content server 735. In addition, the real-time clock may be eliminated in this embodiment and timing information can be obtained over the mobile-content server/ playback device interface 760. The time-stamped response may also include information to identify the user of the playback device 755, 756, . . . 757, the identification of the content provider 710 and/or the identification of the information content. For instance, in the broadcast radio example, the time-stamped response may include the radio channel from which the information content was received.

The mobile-content server 735 receives the time-stamped responses from the playback device 755, 756, . . . 757 and provides feedback to the content provider 710 over a mobile-content server to content provider interface 772. In an embodiment in which the mobile-content server 735 has access to the programming information, the mobile-content server 735 can interpret the time-stamped response received from the playback device 755, 756, . . . 757 and provide the interpreted information to the content provider 710. For instance, if the time-stamped response coincides with an advertisement for a certain product, the mobile-content server 735 can notify the content provider 710 of the name and address of the user responding to the advertisement.

Figure 8:
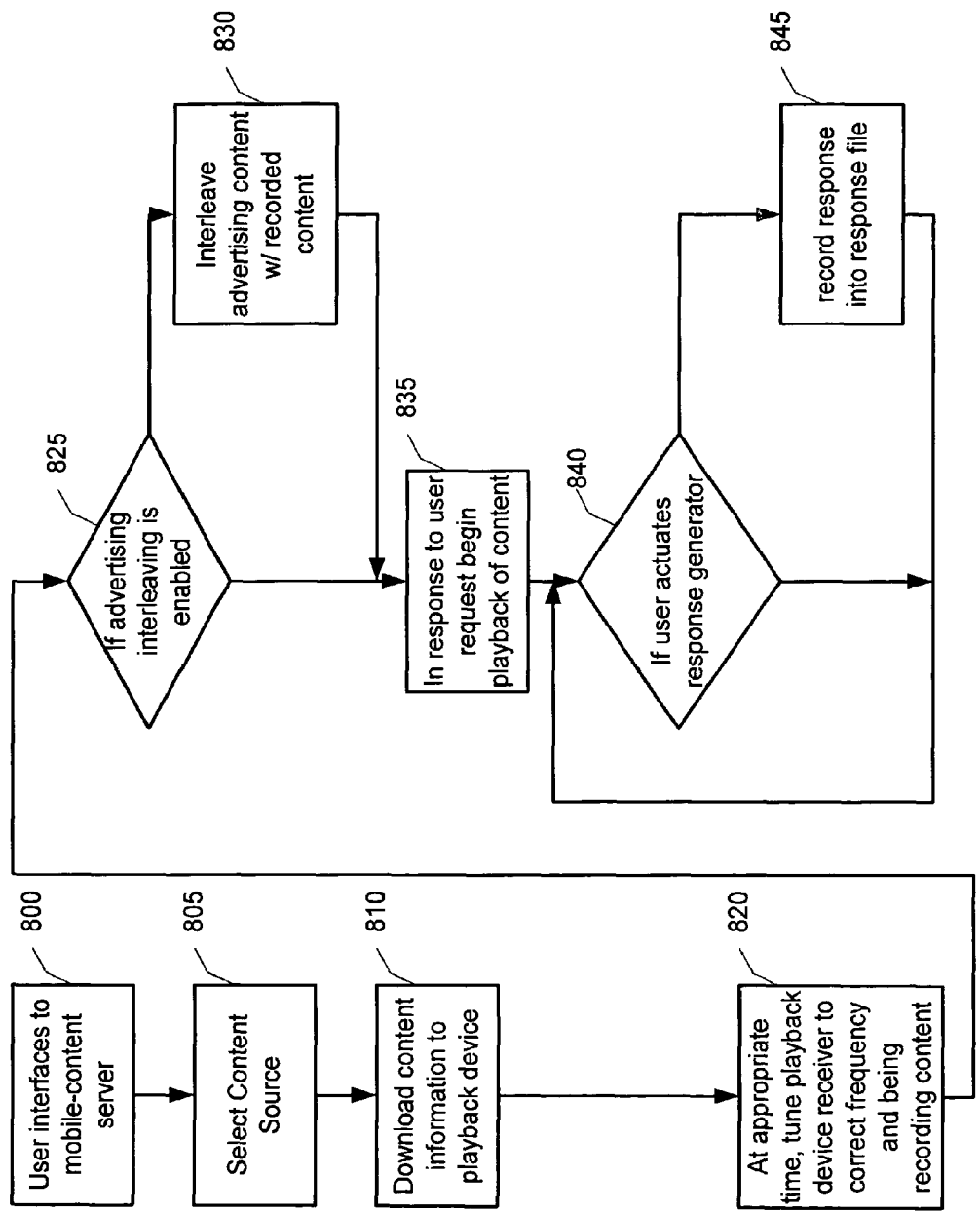
FIG. 8 is a flow diagram illustrating the steps involved in an exemplary implementation of the broadcast recording aspect of the present invention.

FIG. 8 is a flow diagram illustrating the steps involved in an exemplary implementation of the broadcast recording aspect of the present invention. Initially, a user interacts with the mobile-content server 735 (or a client platform) to identify programming or information content that the user desires to receive (step 800). Using various filtering techniques, various content selections are provided to the user (step 805). In an embodiment in which the playback device 755, 756, . . . 757 includes an AM/FM receiver, the filter may include selection of broadcast radio content based on geographical regions, content style, time of day, quality of signal, or a combination of any of these, and/or additional filtering criteria. As a more specific example, the program content for each radio station within a geographic area could be provided to the user. A user could then select the desired program to be received by the playback device 755, 756, . . . 757.

Once selected, the content information is downloaded to the playback device 755, 756, . . . 757 (step 810). In some embodiments, a user may utilize a client platform 720 to interface to the mobile-content server 735 and the playback device 755, 756, . . . 757. In such an embodiment, the content information can be downloaded to the client platform 720 and then subsequently downloaded to the playback device 755, 756, . . . 757. In contrast to the previously-described embodiments, this process will not download specific content (i.e., content segments), but rather, this process will download programming information. For instance, if a user living in Atlanta Ga. desires to listen to the Neal Boortz show on his or her way home from work, then the radio channel (WSB AM 750) along with a start-time (8:30 AM Eastern Time) and either an end-time (1:00 PM Eastern Time) or a duration (4.5 hours) is downloaded to the client platform or the playback device 755, 756, . . . 757. In addition, advertising content may also be downloaded to the client platform or the playback device 755, 756, . . . 757 in either raw form or in the form of segments.

While the user is at work, play, or the like, the playback device 755, 756, . . . 757 conveniently and automatically tunes to the appropriate channel (WSB AM 750) at the start-time (8:30 AM) and begins recording broadcast content (step 820).

If mobile-content server 735 and or the client platform 720 provides advertising content to the playback device 755, 756, . . . 757, and if advertising is enabled by the playback device 755, 756, . . . 757 (step 825), then the playback device 755 can periodically interleave advertising segments into the broadcast content being recorded (step 830). Alternatively, the playback device 755, 756, . . . 757 can interleave the advertising content with the recorded content during playback. When the user is ready to listen to the recorded content (i.e., on his or her way home from the office), the user selects and initiates the playback (step 835).

The closed-loop response aspect of the previously-described embodiments of the present invention is still available in this embodiment of the present invention. If the user actuates the response generator (step 840), the playback device 755, 756, . . . 757 will record the received response as an entry in the response file. For advertising content, the entry in the response file will be the same as previously described for other embodiments. Entries into the response file for the recorded content will include a time-stamp indicating the portion of the content in which the response generator was activated, along with the source and start-time information for the recorded content. The mobile-content server 735 and/or the client platform 720 will interpret the entries in the response file and initiate any necessary additional processing. For instance, the broadcast content may contain advertisements. The mobile-content server 735, either in conjunction with the broadcast station or independently can identify which advertisements are active at certain times. Thus, if an entry in the response file coincides with a broadcast advertisement, the mobile-content server 735 can provide this feedback information to the advertiser and/or the broadcast station. Likewise, the mobile-content server 735 can partition the broadcast content based on guest speakers, topics, or the like. Specific responses can then be initiated by the mobile-content server 735 for entries in the response file coinciding with various speakers and/or topics.

This aspect of the present invention can also be used to generate rating information concerning the broadcast content. For instance, the playback device 755, 756, . . . 757 could automatically generate entries in the response file to indicate the time and duration that the user listened to the recorded content. The mobile-content server 735 can then provide this information to the broadcast company.

It will be clear to the reader, that although this aspect of the present invention has been described as operating with an AM/FM receiver, modifying the playback device 755 will enable the recording of a wide variety of content. Examples of such content include VHF/UHF, satellite, cellular, pager, BlueTooth and other similar broadcast content. In addition, the operations provided by the mobile-content server 735, the client platform 720 and the playback device 755 are only described separately to facilitate understanding of the operation of this embodiment of the present invention. It is fully anticipated that some or all of these operations can be combined into fewer components and still maintain the overall operation of the present invention.

Figure 9:
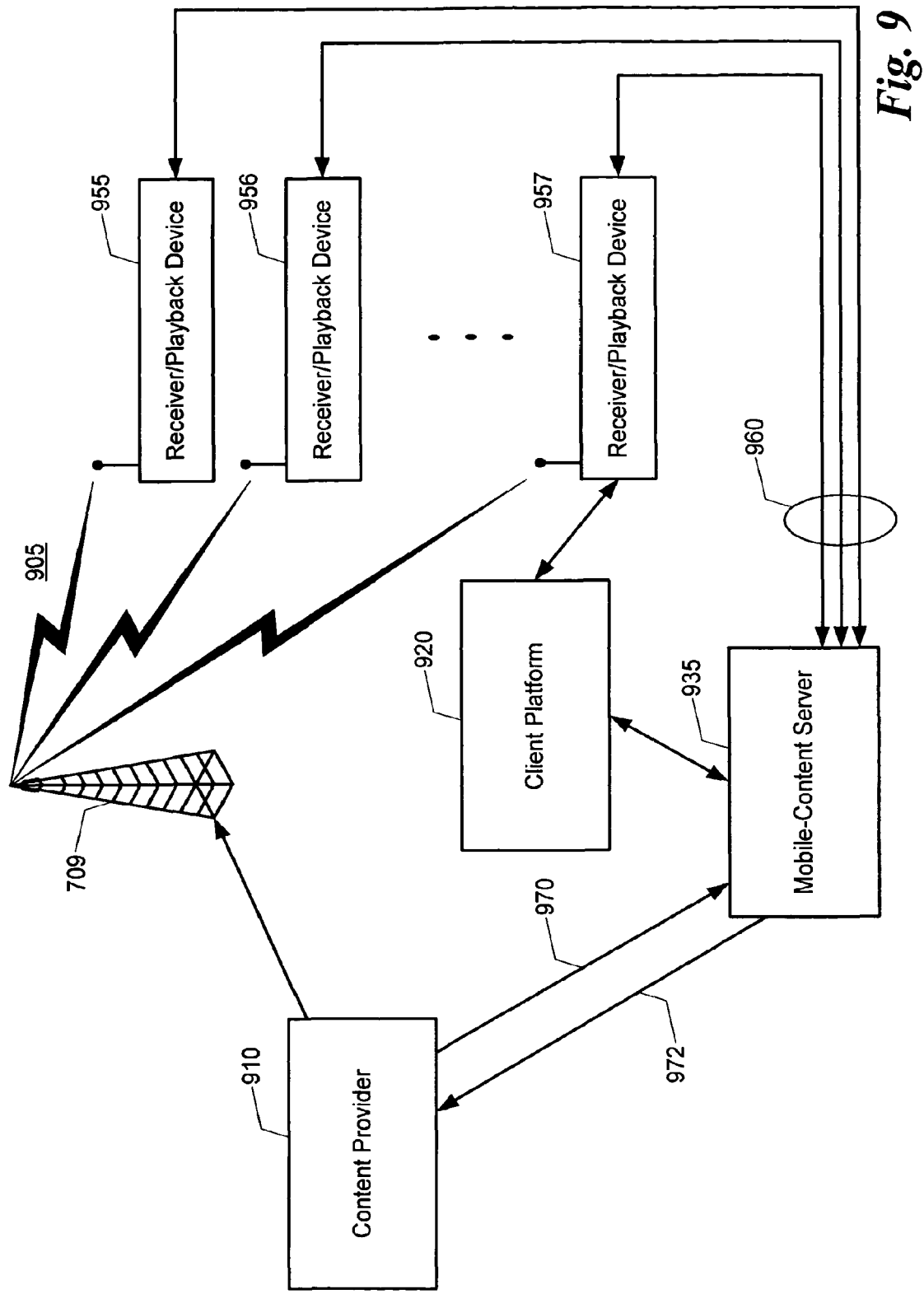
FIG. 9 illustrates the system architecture of cellular telephone based embodiment of the present invention.

FIG. 9 illustrates the system architecture of cellular telephone based embodiment of the present invention. In this embodiment, a content provider 910 interfaces with a mobile-content server 935 over a content provider to mobile-content server communication path 970. As previously described, this interface may be implemented through the use of the Internet, or through other means. Through the mobile-content server 935, a user can browse and select information content to be delivered to the playback device 955, 956, . . . 957. The user can identify or select specific information content and/or build one or more program list including various pieces of information content.

In this embodiment of the present invention, the playback device 955, 956, . . . 957 includes a cellular telephone network interface. To access the information content, the user simply dials the content provider 910 using a predetermined telephone number, preferably a toll-free number. The user may then be prompted to enter a personal identifier number ("PIN"); however, this is not a required aspect of the present invention. The content provider 910 then provides an audio or text announcement to the user. In one embodiment, the announcement may state that a certain number of programs are available and request to user to take an action, such as pressing a key, to select one of the programs. In another embodiment, a program may be automatically selected based on various factors such as the time of day, the access telephone number, the caller identification of the playback device 955, 956, . . . 957, or other similar factors. In either case, the information content can then be delivered to the playback device over the cellular telephone network. The playback device 955, 956, . . . 957 may either record and store the content or audibly deliver the content to the user. In this embodiment of the present invention, the playback device 955, 956, . . . 957 may include additional user interface functions, such as a pause button to temporarily suspend the playback or recording of the information content, a resume button to resume the playback or recording of the information where it left off, and a stop button to terminate the playback or recording. It should be understood to those skilled in the art that although this embodiment of the present invention is described in terms of utilizing a cellular network, additional communication systems may also be utilized such as satellite, trunked radio, or the like. In addition, the delivery of the information content in this embodiment may be performed using directly encoded audio, similar to a voice channel in the cellular network, or by sending MP3 or other similar files via a digital channel.

In this embodiment of the present invention, the closed loop response aspect of the present invention can also be implemented using the underlying communications network. In the cellular communications network example, as the user is listening to the information content, the user can actuate the response generator and send the response directly to the content provider 910. Alternatively, responses can be stored in the playback device 955, 956, . . . 957 to be uploaded to the content provider 910 directly at a later date, or indirectly through the mobile-content server 935.

In an alternate embodiment of the present invention, the playback device may include wireless browsing technology. The wireless browsing technology may be based on the handheld markup language (HDML) or the wireless application protocol (WAP) currently in development, windows CE, or other similar technology that may be developed in the future. In this embodiment of the present invention, the playback device 955, 956, . . . 957 accesses the content provider 910 via the wireless browsing interface. As those skilled in the art will be familiar, this type of technology generally will result in the presentation of a menu or card that includes one or more selections for the user. FIG. 10 is a display diagram illustrating exemplary menu configurations for an exemplary embodiment of the present invention. At the top level menu 1010, the user is presented with the options to: (1) receive a stock quote; (2) check email messages; or (3) access the I2GO content source. By selecting the I2GO content source, the user is presented with a second level menu 1020. In this embodiment of the invention, the user is presented with programs of information content that can be selected. For instance, the user is presented with the options to select: (1) news programming; (2) miscellaneous programming; (3) morning programming; or (4) evening programming. As previously described, the user can generate and define these programming options through the mobile-content server 935 or through other means. Upon selecting the programming, the content provider 910 can deliver the information content to the playback device 955, 956, . . . 957. The information content can be delivered to the playback device 955, 956, . . . 957 by the content provider 910 automatically placing a call to the playback device 955, 956, . . . 957. This technique will result in opening a voice channel between the content provider 910 and the playback device 955, 956, . . . 957 whereby the information content can be delivered. Alternatively, the playback device 955, 956, . . . 957 can call a predefined number, as described above, to receive the information content from the content provider 910. In yet another embodiment, the playback device 955, 956, . . . 957 or the content provider 910 can be programmed to automatically initiate the download of the information content at a later time. Thus, using this embodiment of the present invention, the user can select information content to be received and then schedule a time for the information content to be delivered to the playback device 955, 956, . . . 957 and recorded for later playback.

From the foregoing description, it will be appreciated that the present invention describes a method and a system for implementing a closed loop response architecture in electronic commerce. The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is described by the appended claims and supported by the foregoing description.

What is claimed is:

1. A device that can present broadcast media content and receive response information, the device comprising: a memory storage unit; a content interface including a receiver for receiving broadcast media content; a processing unit coupled to the memory storage unit and the receiver, the processing unit, in response to instructions stored in the memory storage unit, being configured to: render broadcast media content in real-time; receive response information while the broadcast media content is being rendered and without interrupting the delivery of the broadcast media content; associate the response information with the particular broadcast media content being rendered at the time the response information was received by creating an identifier that includes the response type and the content identifier; and provide the information identifier to an external system for the purpose of triggering an action that is based at least in part on the response information and the particular broadcast media content that is being rendered in real-time; further comprising a response actuator, and wherein the processor is configured to receive response information by an actuation of the response actuator by a user and, without any further action from the user, automatically performing the remaining actions of associating the response information with the particular broadcast media content, creating an identifier and providing the identifier to an external system for the purpose of triggering an action.

2. The device of claim 1, wherein the content interface comprises a tunable receiver configured to receive wirelessly broadcast content.

3. The device of claim 1, wherein the processing unit is operable to by create the identifier by including an identification of the information that identifies the particular broadcast media content that was being rendered when the response signal was received and the type of the response.

4. A device that can render broadcast media content in real-time, the device comprising:
a memory storage unit;
a content system interface;

a response generator;
a processing unit coupled to the memory storage unit and the response generator, the processing unit, in response to instructions stored in the memory storage unit, being operative to:
receive broadcast media content via the content system interface;
render the media content in real-time;
detect an actuation of the response generator;
identify the media content being rendered in real-time at the time of the actuation without interrupting the rendering of the media content in real-time;
create an identifier that includes the identity of the media content being rendered and the type of response associated with the actuation of the response indicator; and
initiate a purchase transaction based on the identified media content without interrupting the rendering of the media content in real-time by providing the identifier to an external system; and wherein the processor is configured to receive response information by an actuation of the response actuator by a user and, without any further action from the user, automatically performing the remaining actions of associating the response information with the particular broadcast media content, creating an identifier and providing the identifier to an external system for the purpose of triggering an action.

5. A system for obtaining, delivering, storing and rendering media content, the system comprising:
a device comprising:
a memory storage unit;
a content system interface;
a user interface including a response actuator;
a processing unit coupled to the memory storage unit, the processing unit, in response to instructions stored in the memory storage unit, being operative to:
receive media content via the content system interface;
render the media content in real-time; and
without interrupting the rendering of the media content in real-time, receive an actuation of the response actuator and creating a record indicating that the response actuator was actuated during the playback of media content, such record identifying the media content that was actively being rendered and the type of response;
provide the record to an external system for triggering an action based at least in part on the record; and wherein the processor is configured to receive an actuation of the response actuator by receiving response information by an actuation of the response actuator by a user and, without any further action from the user, automatically performing the remaining actions of associating the response information with the particular broadcast media content, creating an identifier and providing the identifier to an external system for the purpose of triggering an action; and
a content system comprising:
a device interface;
an interface to the Internet; and
the content system being operable to:
receive media content from sources accessible via the Internet interface; and
deliver the media content to the device.

6. The system of claim 5, wherein the content system is further operable to: receive identification information for particular content; access a source via the Internet to obtain particular content associated with the identification information; and store the particular content for delivery to the device.

* * * * *